(12) United States Patent
Komatsu et al.

(10) Patent No.: US 8,722,809 B2
(45) Date of Patent: May 13, 2014

(54) PROCESS FOR PREPARING END-MODIFIED VINYLIDENE FLUORIDE ELASTOMER

(75) Inventors: Yuzo Komatsu, Settsu (JP); Haruhiko Mohri, Settsu (JP); Hirokazu Aoyama, Settsu (JP); Takanori Fukushima, Tokyo (JP); Takuzo Aida, Tokyo (JP)

(73) Assignees: The University of Tokyo, Tokyo (JP); Daikin Industries, Ltd., Osaka (JP)

( * ) Notice: Subject to any disclaimer, the term of this patent is extended or adjusted under 35 U.S.C. 154(b) by 159 days.

(21) Appl. No.: 12/863,549

(22) PCT Filed: Jan. 20, 2009

(86) PCT No.: PCT/JP2009/050740
§ 371 (c)(1),
(2), (4) Date: Jul. 19, 2010

(87) PCT Pub. No.: WO2009/093565
PCT Pub. Date: Jul. 30, 2009

(65) Prior Publication Data
US 2010/0292408 A1 Nov. 18, 2010

(30) Foreign Application Priority Data
Jan. 21, 2008 (JP) .................................. 2008-010673

(51) Int. Cl.
*C08F 8/26* (2006.01)
*C08F 14/22* (2006.01)
*C08C 19/20* (2006.01)
*C08F 8/36* (2006.01)

(52) U.S. Cl.
CPC ............ *C08C 19/20* (2013.01); *C08F 2810/40* (2013.01); *C08F 14/22* (2013.01); *C08F 8/26* (2013.01); *C08F 8/36* (2013.01)
USPC ...................... 525/326.4; 525/326.2; 525/344; 525/353; 526/85; 526/250; 526/253; 526/255

(58) Field of Classification Search
CPC ....... C08C 19/20; C08F 2810/40; C08F 14/22
USPC ............... 525/326.2, 326.4, 344, 353; 526/85, 526/250, 253, 255
See application file for complete search history.

(56) References Cited

U.S. PATENT DOCUMENTS

| 4,361,678 A | * | 11/1982 | Tatemoto et al. | ............. 528/374 |
| 4,501,869 A | | 2/1985 | Tatemoto et al. | |
| 2007/0185220 A1 | * | 8/2007 | Lochhaas et al. | ............... 521/27 |

FOREIGN PATENT DOCUMENTS

| JP | 51-27889 A | 3/1976 |
| JP | 56-057811 A | 5/1981 |
| JP | 59-020310 A | 2/1984 |
| JP | 10-298386 A | 11/1998 |
| JP | 2002-528433 A | 9/2002 |
| JP | 2005-048121 A | 2/2005 |
| JP | 2005-307026 A | 11/2005 |
| JP | 2006-307051 A | 11/2006 |
| WO | 2007/089017 A1 | 8/2007 |

OTHER PUBLICATIONS

Scott, Journal of Fluorine Chemistry 126 (2005) 1196-1201.*
Ameduri, Journal of Fluorine Chemistry 100 (1999) 97-116.*
Huang, Acta Chimica Sinica (Engl. Ed.), 1, p. 68-72 (1986).*

* cited by examiner

*Primary Examiner* — Robert C Boyle
(74) *Attorney, Agent, or Firm* — Sughrue Mion, PLLC

(57) ABSTRACT

The present invention provides a preparation process for converting to a vinylidene fluoride elastomer having a group having sulfinic acid, sulfinic acid derivative, sulfonic acid or sulfonic acid derivative at one end or both ends of its trunk chain, and the preparation process provides a vinylidene fluoride elastomer having, at one end or both ends of its trunk chain, end groups represented by the formula: —$CR^1R^2$—$CR^3R^4$—$SO_2H$, wherein $R^1$ to $R^4$ may be the same or different and each is hydrogen atom or fluorine atom, by allowing a vinylidene fluoride elastomer having, at one end or both ends of its trunk chain, end groups represented by the formula: —$CR^1R^2$—$CR^3R^4$—$X^1$, wherein $R^1$ to $R^4$ are as defined above, $X^1$ is bromine atom or iodine atom, to react with a sulfur compound represented by the formula: $(M^1)_n H_{2-n} S_2 O_4$, wherein $M^1$ is a monovalent or divalent metal ion or ammonium ion, n is an integer of 0 to 2.

5 Claims, No Drawings

PROCESS FOR PREPARING END-MODIFIED VINYLIDENE FLUORIDE ELASTOMER

TECHNICAL FIELD

The present invention relates to a process for preparing an end-modified vinylidene fluoride elastomer having a group of a specific structure at one end or both ends of its trunk chain.

BACKGROUND ART

Fluorine-containing polymers are widely used in the fields of automobile industry, semiconductor industry and chemical industry because of their superior chemical resistance, solvent resistance and heat resistance.

However, with advances in technologies, more rigorous demand for characteristics has been imposed, and in the fields of aviation and space industries, semiconductor manufacturing equipment, chemical plant and automobile industry, more excellent heat resistance, chemical resistance, solvent resistance and processability are demanded.

In order to improve these various properties, fluorine-containing polymers having crosslinkable functional group introduced at an end thereof have been developed, and a method of introducing crosslinkable functional group easily efficiently is desired.

For example, JP2005-307026A discloses functional fluorine-containing polymer material having sulfonic acid group at an end of a graft chain in a fluorine-containing polymer. In this fluorine-containing polymer material, a resin comprising 5% by mole of trifluorobromoethylene in polytetrafluoroethylene is used, and the amount of sulfonic acid group introduced is about 0.5 meq/g. Accordingly, since reactivity is not good and many functional end groups cannot be introduced, the proposed method has a disadvantage that conversion of Rf-X to sulfonic acid is not necessarily easy.

In Prog. Polymn. Sci., 1989, 14, 251-296 and JP2002-514242A, a method of initiating polymerization with persulfates such as ammonium persulfate and potassium persulfate is described. These documents describes that in free radical polymerization thermally initiating polymerization by using a reducing agent such as sodium sulfite or sodium hydrogensulfite and persulfate, a polymer having both of carboxylic acid end group and sulfonic acid end group is prepared. In the case of this method, polymers having the same functional end groups cannot be obtained, and accordingly, since reactivity of end groups is different, the use as an intermediate of a polymer is difficult.

Further, also introduction of sulfinic acid group in low molecular weight compounds is described in JP11-509244A and Tetrahedron Lett., 1998, 39, 8487-8490. This reaction is carried out under heating in the presence of a basic substance. However, under these conditions, release of fluorine atom from vinylidene fluoride polymer chain occurs, and therefore, the reaction cannot be applied to high molecular reaction of vinylidene fluoride polymer.

DISCLOSURE OF INVENTION

It is an object of the present invention to provide a process for preparing an end-modified vinylidene fluoride elastomer having, at one end or both ends of its trunk chain, groups having sulfinic acid, sulfinic acid derivative, sulfonic acid or sulfonic acid derivative.

The first of the present invention relates to a process for preparing an end-modified vinylidene fluoride elastomer having, at one end or both ends of its trunk chain, end groups represented by the formula (3):

$$—CR^1R^2—CR^3R^4—SO_2M^{(m-1)+} \tag{3}$$

wherein $R^1$ to $R^4$ may be the same or different and each is hydrogen atom or fluorine atom, M is $M^1$ or hydrogen atom, m is the number of valences of $M^1$, $M^1$ is a monovalent or divalent metal ion or ammonium ion,
by allowing a vinylidene fluoride elastomer having, at one end or both ends of its trunk chain, end groups represented by the formula (1):

$$—CR^1R^2—CR^3R^4—X^1 \tag{1}$$

wherein $R^1$ to $R^4$ are as defined above, $X^1$ is bromine atom or iodine atom, to react with a sulfur compound represented by the formula (2):

$$(M^1)_n H_{2-n} S_2 O_4 \tag{2}$$

wherein $M^1$ is as defined above, n is an integer of 0 to 2.

The second of the present invention relates to a process for preparing an end-modified vinylidene fluoride elastomer having, at one end or both ends of its trunk chain, end groups represented by the formula (4):

$$—CR^1R^2—CR^3R^4—SO_2X^2 \tag{4}$$

wherein $R^1$ to $R^4$ may be the same or different and each is hydrogen atom or fluorine atom, $X^2$ is fluorine atom, chlorine atom or bromine atom,
by allowing a vinylidene fluoride elastomer having, at one end or both ends of its trunk chain, end groups represented by the formula (3a):

$$—CR^1R^2—CR^3R^4—SO_2H \tag{3a}$$

wherein $R^1$ to $R^4$ are as defined above, to react with a fluorinating agent, chlorinating agent or brominating agent.

The third of the present invention relates to a process for preparing an end-modified vinylidene fluoride elastomer having, at one end or both ends of its trunk chain, end groups represented by the formula (5):

$$—CR^1R^2—CR^3R^4—SO_3M^2 \tag{5}$$

wherein $R^1$ to $R^4$ may be the same or different and each is hydrogen atom or fluorine atom, $M^2$ is H, alkali metal ion or ammonium ion, by allowing a vinylidene fluoride elastomer having, at one end or both ends of its trunk chain, end groups represented by the formula (4):

$$—CR^1R^2—CR^3R^4—SO_2X^2 \tag{4}$$

wherein $R^1$ to $R^4$ are as defined above, $X^2$ is fluorine atom, chlorine atom or bromine atom, to react with water or alkaline aqueous solution.

It is preferable that a number average molecular weight is 500 to 1,000,000.

It is preferable that the structure of the vinylidene fluoride elastomer excluding both end groups thereof is represented by the formula (6):

wherein 1 is an integer of 7 to 15,000, m is an integer of 1 to 4,900, n is an integer of 0 to 6,500.

It is preferable that the vinylidene fluoride elastomer having, at one end or both ends of its trunk chain, end groups represented by the formula (1) is a vinylidene fluoride elastomer obtained by iodine transfer polymerization.

BEST MODE FOR CARRYING OUT THE INVENTION

The first of the present invention relates to the process for preparing the end-modified vinylidene fluoride elastomer having, at one end or both ends of its trunk chain, end groups represented by the formula (3):

$$—CR^1R^2—CR^3R^4—SO_2M^{(m-1)+} \quad (3)$$

wherein $R^1$ to $R^4$ may be the same or different and each is hydrogen atom or fluorine atom, M is $M^1$ or hydrogen atom, m is the number of valences of $M^1$, $M^1$ is a monovalent or divalent metal ion or ammonium ion,
by allowing the vinylidene fluoride (hereinafter also referred to as VdF) elastomer having, at one end or both ends of its trunk chain, end groups represented by the formula (1):

$$—CR^1R^2—CR^3R^4—X^1 \quad (1)$$

wherein $R^1$ to $R^4$ are as defined above, $X^1$ is bromine atom or iodine atom, to react with the sulfur compound represented by the formula (2):

$$(M^1)_n H_{2-n} S_2 O_4 \quad (2)$$

wherein $M^1$ is as defined above, n is an integer of 0 to 2 (hereinafter also referred to as sulfination reaction).

In the present invention, the VdF elastomer to be used in the preparation process of the first invention is not limited as far as it is the VdF elastomer having, at one end or both ends of its trunk chain, end groups represented by the formula (1). The elastomer is one having a vinylidene fluoride (VdF) unit.

Preferred examples of the VdF elastomer are those represented by the formula (8).

$$-(A^1)-(A^2)-(B^1)- \quad (8)$$

wherein the structural unit $A^1$ is a structural unit derived from VdF ($a^1$), the structural unit $A^2$ is a structural unit derived from a fluorine-containing ethylenic monomer ($a^2$), and the structural unit $B^1$ is a structural unit derived from a monomer ($b^1$) being copolymerizable with the monomer ($a^1$) and the monomer ($a^2$).

Among the VdF elastomers represented by the formula (8), the elastomer comprising 45 to 85% by mole of the structural unit $A^1$ and 55 to 15% by mole of the structural unit $A^2$ is preferred, and the elastomer comprising 50 to 80% by mole of the structural unit $A^1$ and 50 to 20% by mole of the structural unit $A^2$ is more preferred. It is preferable that the structural unit $B^1$ is contained in an amount of 0 to 10% by mole based on the total amount of the structural unit $A^1$ and the structural unit $A^2$.

One or more monomers can be used as the fluorine-containing ethylenic monomer ($a^2$), and examples thereof are fluorine-containing monomers, for example, TFE, chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE) and vinyl fluoride. Among these, TFE, HFP and PAVE are preferred.

Any of monomers can be used as the monomer ($b^1$) as far as it is copolymerizable with the monomer ($a^1$) and the monomer ($a^2$), and examples thereof are ethylene, propylene, alkyl vinyl ether, and the like.

Examples of the VdF elastomer are VdF type fluorine-containing rubbers, TFE/propylene/VdF type fluorine-containing rubbers, ethylene/HFP/VdF type fluorine-containing rubbers, and the like, and these can be used alone or can be used in optional combination thereof to such an extent not to impair the effect of the present invention.

Among these, examples of suitable VdF elastomer are VdF type fluorine-containing rubbers such as VdF/HFP type rubber, VdF/HFP/TFE type rubber, VdF/CTFE type rubber and VdF/CTFE/TFE type rubber. Example of the above-mentioned VdF/HFP type rubber and VdF/HFP/TFE type rubber is a structure represented by the formula (6):

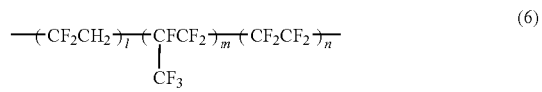

wherein it is preferable that l is an integer of 7 to 15,000, m is an integer of 1 to 4,900, n is an integer of 0 to 6,500 and more preferably l is an integer of 8 to 12,000, m is an integer of 1 to 4,900, n is an integer of 0 to 6,500.

Radical polymerization initiators to be used for preparing the VdF elastomer may be the same as those which have been used for polymerization of VdF elastomers. Examples of such initiators are organic or inorganic peroxides and azo compounds. Examples of represented initiators are persulfates, peroxycarbonates, peroxyesters, and the like. A preferred initiator is ammonium persulfate (APS).

A variety of emulsifying agents can be used as an emulsifying agent to be used for the emulsion polymerization. From the viewpoint of inhibiting a chain transfer reaction to molecules of the emulsifying agent which arises during the polymerization, salts of carboxylic acids having a fluorocarbon chain or fluoropolyether chain are desirable. An amount of the emulsifying agent is preferably from about 0.05% by weight to about 2% by weight, particularly preferably 0.2 to 1.5% by weight based on added water.

Since the monomer mixture gas used in the present invention is explosive as described in Advances in Chemistry Series, G. H. Kalb et al, 129, 13 (1973), it is necessary to take measures for a polymerization equipment not to cause a sparking.

A polymerization pressure can be changed in a wide range, generally within a range from 0.5 to 7 MPa. The higher the polymerization pressure is, the more the polymerization rate is increased. Therefore, from the viewpoint of enhancement of productivity, it is preferable that the polymerization pressure is not less than 0.8 MPa.

With respect to the number average molecular weight of the VdF elastomer, from the viewpoint that formation of three-dimensional network structure by crosslinking tends to be difficult, and that the structural unit of the monomer at the end of the VdF elastomer does not become stable, resulting in change of chemical stability, the number average molecular weight of the VdF elastomer is preferably not less than 500, more preferably not less than 1,000, further preferably not less than 5,000. Also, the number average molecular weight of the VdF elastomer is preferably not more than 1,000,000, further preferably not more than 300,000, from the viewpoint of good solubility in a solvent.

Examples of the end group represented by the formula (1) are —$CF_2CH_2I$, —$CF_2CH_2Br$, —$CH_2CF_2I$, —$CH_2CF_2Br$, —$CF_2CF_2I$, —$CF_2CF_2Br$, and the like.

Especially preferred example of the process for preparing the VdF elastomer having the end group represented by the formula (1) is a known iodine transfer polymerization method from the viewpoint that a molecular weight distribution of the obtained polymer is narrow and control of a molecular weight is easy. By the iodine transfer polymerization method, iodine atom can be easily introduced to the end of the polymer.

For example, there is a method of emulsion-polymerizing or solution-polymerizing monomers constituting the above-mentioned VdF elastomer and if necessary, a monomer providing a cure site with stirring under pressure in water medium substantially under oxygen-free condition in the presence of an iodine compound and/or a bromine compound, preferably a diiodine compound and/or a dibromine compound by using a radical polymerization initiator.

Represented examples of an iodine compound or bromine compound to be used are compounds represented by the formula (7):

$$R^7I_xBr_y \tag{7}$$

wherein each of x and y is 0 or an integer of 1 to 2 and satisfies $1 \le x+y \le 2$, $R^7$ is a saturated or unsaturated fluorohydrocarbon group or chlorofluorohydrocarbon group having 1 to 8 carbon atoms or a hydrocarbon group having 1 to 3 carbon atoms and may have oxygen atom. To the end of the VdF elastomer so-obtained by using such an iodine compound or bromine compound is introduced iodine atom or bromine atom (cf. for example, JP53-125491A and JP63-304009A).

The amount of iodine compound or bromine compound represented by the formula (7) is within a range from 0.0001 to 15% by weight based on the total weight of the obtained VdF elastomer.

Also, iodine compounds and/or bromine compounds of alkali or alkali earth metal described in JP3-52907A can be used as a chain transfer agent. Chain transfer agents known in the prior art such as ethyl acetate and diethyl malonate can also be used together with a chain transfer agent containing iodine and/or bromine.

Preferred examples of the sulfur compound to be used in the sulfination reaction in the first invention are dithionites represented by the formula (2):

$$(M^1)_nH_{2-n}S_2O_4 \tag{2}$$

wherein $M^1$ is a monovalent or divalent metal ion or ammonium ion, n is 0 or an integer of 1 to 2.

Examples of the monovalent or divalent metal ion of $M^1$ are alkali metal ions such as $Li^+$, $Na^+$ and $K^+$, alkali earth metal ions such as $Mg^{2+}$ and $Ca^{2+}$, $Zn^{2+}$ and $NH_4^+$.

Examples of the compounds represented by the formula (2) are monovalent metal salts such as $Na_2S_2O_4$, $K_2S_2O_4$, $Li_2S_2O_4$, $NaHS_2O_4$, $KHS_2O_4$, and $LiHS_2O_4$; divalent metal salts such as $ZnS_2O_4$, $MgS_2O_4$ and $CaS_2O_4$; and ammonium salts such as $(NH_4)_2S_2O_4$ and $(NH_4)HS_2O_4$.

The amount of sulfur compound is preferably 1 equivalent or more, more preferably 5 equivalent or more to one end group of the VdF elastomer in consideration of inhibition of reactivity due to steric hindrance and/or neighboring group effect of the elastomer, and/or decreasing reactivity due to lowering diffusion of the sulfur compound. Also, the amount of sulfur compound is preferably not more than 500 equivalents, more preferably not more than 100 equivalents, further preferably not more than 30 equivalents to one end group of the VdF elastomer, in order that a large amount of low molecular weight sulfur compound derived from the used sulfur compound should not remain in the obtained reaction product of the VdF elastomer.

Since proceeding of the sulfination reaction is not delayed even at low temperature, the reaction temperature is preferably not less than $-50°$ C., more preferably not less than $-20°$ C. Also, since side reaction of eliminating $SO_2$ from the obtained end group proceeds at high temperatures, the reaction temperature is preferably not more than 150° C., further preferably not more than 100° C.

The reaction time in the sulfination reaction may be optionally selected depending on kind of an end group and a reaction temperature. When the reaction time is longer, since a side reaction, i.e., elimination of $SO_2$ from the end group proceeds, the reaction time is desirably as short as possible. Concretely it is preferable to conduct the reaction within a period of time of from 0.5 to 24 hours.

Examples of a solvent to be used in the sulfination reaction are dimethyl sulfoxide (DMSO), sulfolane, dimethyl sulfone, dimethyl sulfate, diethyl sulfate, acetonitrile, acetone, 2-methyl-2-propanol, ethyl acetate, 4-methylpentan-2-on, acetone, 2-butanone, 1,1-dichlorofluoroethane (HCFC-141b), 1,1,2-trichlorotrifluoroethane (CFC-113), tetrachlorohexafluorobutane, dichlorooctafluorobutane, pentachloropentafluorohexane, dibromotetrafluoroethane, perfluorohexane, hexafluoro-2-propanol, trifluoroethanol, 2,2,3,3-tetrafluoropropanol and the like. Also, the solvent may be a mixture of these organic solvents with water.

In the sulfination reaction, an additive may be blended for the purpose of inhibiting the side reaction, i.e., elimination of $SO_2$. Examples of an additive are chlorotrimethylsilane, bromotrimethylsilane, benzylchlorodimethylsilane, t-butyl dimethylchlorosilane, t-butyl diphenylchlorosilane, chlorodimethylphenylsilane, di-t-butyl dichlorosilane, dichlorodimethylsilane, diphenylmethylchlorosilane, methyltrichlorosilane, tetrachlorosilane, trichlorosilane, trichlorovinylsilane, triisopropylchlorosilane, triethylchlorosilane, triphenylchlorosilane, trimethylsilyl trifluoromethane sulfonate, and the like. By the use of these additives, further effects such as pH control and protection of active end can be expected.

Also, when M of $-SO_2M$ of the formula (3) is $M^1$ (monovalent or divalent metal ion or ammonium ion), $-SO_2M$ can be easily converted to $-SO_2H$ (formula (3a)) by contact with water.

According to the preparation process of the first invention, the VdF elastomer having the end represented by the formula (1) at one end or both ends of its trunk chain is used as the starting substance, and one end or both ends of the trunk chain of the VdF elastomer can be subjected to sulfination at high yield (70% or more) by high molecular reaction, and the VdF elastomer having the end group represented by the formula (3) at one end or both ends of its trunk chain can be prepared.

Also, in the present invention, the second invention relates to the process for preparing the end-modified vinylidene fluoride elastomer having, at one end or both ends of its trunk chain, end groups represented by the formula (4):

$$-CR^1R^2-CR^3R^4-SO_2X^2 \tag{4}$$

wherein $R^1$ to $R^4$ may be the same or different and each is hydrogen atom or fluorine atom, $X^2$ is fluorine atom, chlorine atom or bromine atom,
by allowing a VdF elastomer having, at one end or both ends of its trunk chain, end groups represented by the formula (3a):

$$-CR^1R^2-CR^3R^4-SO_2H \tag{3a}$$

wherein $R^1$ to $R^4$ are as defined above, to react with a fluorinating agent, chlorinating agent or brominating agent (hereinafter also collectively referred to as "halogenation agent") (hereinafter also referred to as "halogenation reaction").

The end group of sulfinic acid represented by the formula (3a) can be easily obtained, for example, by acting water on a VdF elastomer having, at one end or both ends of its trunk chain, end groups represented by the formula (3).

Examples of the halogenation agent to be used for the halogenation reaction are fluorinating agents such as $F_2$ and $IF_5$; chlorinating agents such as $Cl_2$, ICl, $CuCl_2$, $FeCl_3$, N-chlorosuccinic acid imide and $SO_2Cl_2$; and brominating agents such as $Br_2$, BrCl, IBr, $CuBr_2$, $FeBr_3$, N-bromosuccinic acid imide and $SO_2Br_2$. Among these, $Cl_2$, $Br_2$, $CuCl_2$, $FeCl_3$ and $SO_2Cl_2$ are preferred from the viewpoint of reactivity, easy handling and cost.

The amount of halogenation agent is preferably 1 equivalent or more, further preferably 5 equivalent or more to one end group of the VdF elastomer from the viewpoint of decreasing reactivity due to steric hindrance and/or neighboring group effect of the elastomer, and/or due to lowering diffusion of the halogenation agent. Since a halogenation agent having a boiling point can be easily removed by evaporation under normal pressure or reduced pressure, it can be used in a largely excessive amount. On the other hand, in the case of the halogenation agent being a metal halide, a step for removing a metallic compound, for example, by filtration under water-free condition is necessary. Therefore, the amount of halogenation agent is preferably 500 equivalents or less, more preferably 100 equivalents or less, further preferably 30 equivalents or less to one end group of the VdF elastomer.

The reaction temperature in the halogenation reaction may be optionally selected depending on kind of a halogenation agent and kind of an end group. In order to inhibit thermal decomposition reaction of the polymer chain and the end group, it is preferable that the halogenation reaction is carried out at as low temperature as possible of not more than a decomposition temperature. For example, the reaction temperature is preferably within a range from $-30°$ C. to $150°$ C.

The reaction time in the halogenation reaction is not limited particularly, and may be optionally selected depending on kind of a halogenation agent and kind of an end group.

In the halogenation reaction, any solvents can be used as far as they are stable for the halogenation agent, and a solvent may be optionally selected depending on kind of elastomer. Examples thereof are acetonitrile, acetic acid, trifluoroacetic acid, formic acid, oxalic acid, dichloromethane, carbon tetrachloride, benzonitrile, nitromethane, nitrobenzene, dichloropentafluoropropane (HCFC-225), 1,1-dichlorofluoroethane (HCFC-141b), 1,1,2-trichlorotrifluoroethane (CFC-113), tetrachlorohexafluorobutane, dichlorooctafluorobutane, pentachloropentafluorohexane, dibromotetrafluoroethane, perfluorohexane, perfluorodecane, perfluoro(2-butyltetrahydrofuran), perflluorotributylamine, hexafluoro-2-propanol, trifluoroethanol, 2,2,3,3-tetrafluoropropanol and the like. Also, the solvent may be a mixture of these solvents.

Preferred examples of the end group represented by the formula (4) are —$CF_2CH_2SO_2Cl$, —$CF_2CH_2SO_2Br$, —$CH_2CF_2SO_2Cl$, —$CH_2CF_2SO_2Br$, —$CF_2CF_2SO_2Cl$ and —$CF_2CF_2SO_2Br$.

In the present invention, the third invention relates to the process for preparing the end-modified VdF elastomer having, at one end or both ends of its trunk chain, end groups represented by the formula (5):

     (5)

wherein $R^1$ to $R^4$ may be the same or different and each is hydrogen atom or fluorine atom, $M^2$ is H, alkali metal ion or ammonium ion, by allowing the VdF elastomer having, at one end or both ends of its trunk chain, end groups represented by the formula (4):

     (4)

wherein $R^1$ to $R^4$ are as defined above, $X^2$ is fluorine atom, chlorine atom or bromine atom, to react with water or alkaline aqueous solution (hereinafter also referred to as "hydrolysis reaction").

The VdF elastomer having; at one end or both ends of its trunk chain, the end groups represented by the formula (4) can be prepared by the second invention.

$M^2$ is hydrogen atom, alkali metal ion or ammonium ion, and examples of alkali metal ion or ammonium ion are $Na^+$, $K^+$, $Li^+$ and $N(R^{10})_4^+$, where $R^{10}$ is hydrogen atom or an alkyl group having 1 to 10 carbon atoms. Among these, $Na^+$, $Li^+$, $K^+$, $NH_4^+$, $(C_4H_9)_4N^+$, $(CH_3)_4N^+$ and $(C_2H_5)_4N^+$ are preferred.

Hydrolysis reaction can be carried out in the presence of only water in the case where $X^2$ in the formula (4) is chlorine atom or bromine atom. An acid such as hydrochloric acid may be used as a catalyst. Further, in the second invention, by conducting the halogenation reaction in the presence of water, it is possible to prepare the VdF elastomer having, at one end or both ends of its trunk chain, the end groups ($M^2$=H) represented by the formula (5) by successively carrying out the halogenation reaction and then the hydrolysis reaction without separating the VdF elastomer having, at one end or both ends of its trunk chain, the end groups represented by the formula (4).

Also, the hydrolysis reaction can be carried out by using an alkaline aqueous solution (this reaction can be said to be so-called neutralization reaction). This method can be applied to any of the cases where $X^2$ in the formula (4) is chlorine atom, bromine atom or fluorine atom, and is especially effective in the case of fluorine atom.

Examples of alkaline compound are NaOH, LiOH, KOH, $NR^{10}_4OH$ ($R^{10}$ may be the same or different and each is hydrogen atom or an alkyl group having 1 to 10 carbon atoms), $NaHCO_3$, $LiHCO_3$, $KHCO_3$, $Na_2CO_3$, $Li_2CO_3$, $K_2CO_3$, and the like. From the viewpoint of availability at low cost, NaOH, LiOH, KOH, $NH_4OH$, $(C_4H_9)_4NOH$, $(CH_3)_4NOH$, $(C_2H_5)_4NOH$, $NaHCO_3$, $LiHCO_3$, $KHCO_3$, $Na_2CO_3$, $Li_2CO_3$ and $K_2CO_3$ are preferred.

The amount of alkaline aqueous solution may be optionally selected depending on strength of basicity of the alkaline compound, and is preferably one equivalent or more to one end group of the VdF elastomer.

Also, the concentration of alkaline aqueous solution may be optionally selected depending on strength of basicity, but since the use of alkaline aqueous solution having high concentration causes dehydrofluorination of the VdF chain of the VdF elastomer, it is preferable that the concentration of alkaline aqueous solution is 4 M or lower.

The reaction temperature of the hydrolysis reaction may be optionally selected depending on kind of $X^2$ and kind and concentration of the alkaline aqueous solution. In order to inhibit decomposition reaction of the polymer chain and the end group, it is preferable that the hydrolysis reaction is carried out at as low temperature as possible of not more than a decomposition temperature. Concretely it is preferable that the reaction is carried out within a temperature range from a freezing point of a solvent to $150°$ C.

The reaction time in the hydrolysis reaction is not limited particularly, and may be optionally selected depending on whether or not an acid catalyst is used, kind and concentration of the alkaline aqueous solution, kind of an end group and a reaction temperature.

Examples of a solvent for the hydrolysis reaction are tetrahydrofuran, t-butyl methyl ether, diethyl ether, dioxane, dimethoxymethane, 1,2-dimethoxyethane, ethylene glycol dimethyl ether, ethylene glycol diethyl ether, diethylene glycol dimethyl ether, triethylene glycol dimethyl ether, tetraethylene glycol dimethyl ether, methanol, ethanol, 1-propanol, 2-propanol, 1-butanol, 2-butanol, 2-methyl-1-propanol, 2-methyl-2-propanol, cyclohexanol, ethylene glycol, propylene glycol, ethylene glycol monomethyl ether, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, 4-methylpentan-2-on, acetone, 2-butanone, 2-pentanone, 2-hexanone, 2-heptanone, cyclohexanone, methyl amino ketone, acetonitrile, N,N-dimethylformamide, N,N-dimethylacetamide, N-methylpyrrolidone, ethyl acetate, methyl acetate, propyl acetate, butyl acetate, γ-butyrolactone, dimethyl sulfoxide, sulfolane, dichloromethane, 1,2-dichloroethane, 1,1,2-trichloroethane, carbon tetrachloride, dichloropentafluoropropane (CFC-225), 1,1-dichlorofluroethane (HCFC-141b), 1,1,2-trichlorotrifluoroethane (CFC-113), tetrachlorohexafluorobutane, dichlorooctafluorobutane, pentachloropentafluorohexane, dibromotetrafluoroethane, perfluorohexane, perfluorodecane, perfluoro(2-butyltetrahydrofuran), perfluorotributylamine, hexafluoro-2-propanol, trifluoroethanol and 2,2,3,3-tetrafluoropropanol. Also, the reaction can be carried out with two layers together with an alkaline aqueous solution.

The end-modified VdF elastomer obtained by the first to the third inventions can enhance adhesion to other material and dispersibility of filler. Further, the VdF elastomer can be converted to a liquid rubber, a thermoplastic elastomer and a block copolymer by changing the end sulfonic acid derivative of the VdF elastomer to a reactive substituent.

EXAMPLE

The present invention is then explained by means of examples, but is not limited to them.

Various analyses and measurements in the present invention were carried out by the following methods.

(1) NMR: (NM-Excalibur 500) available from JEOL
$^1$H-NMR measuring conditions: 500 MHz (tetramethylsilane=0 ppm)
$^{19}$F-NMR measuring conditions: 500 MHz (trichlorofluoromethane=0 ppm)
$^{13}$C-NMR: 125 MHz (tetramethylsilane=0 ppm)

(2) Gel permeation chromatography (GPC):

The number average molecular weight is calculated by conversion based on polystyrene from the data obtained by measuring by gel permeation chromatography (GPC) by using GPC HLC-8020 available from TOSO CORPORATION and columns available from Shodex (one GPC KF-801, one GPC KF-802 and two GPC KF-806M are connected in series) and flowing tetrahydrofuran (THF) as a solvent at a flowing rate of 1 ml/min. An error of a molecular weight in this measurement by GPC by conversion based on polystyrene is about ±300.

Preparation Example 1

Preparation of VdF Elastomer Having —$CF_2CH_2I$ at its End

To a 3.0-liter autoclave were supplied pure water (1,500 g) and 20% by weight aqueous solution of ammonium perfluorooctanoate (22 g). The inside of a system was replaced by nitrogen gas and was evacuated. Then, the inside temperature was increased to 80° C., and HFP was introduced with the inside pressure being 0.73 MPa and further, VdF was introduced with the inside pressure being 1.5 MPa. Then, 1,4-diiodooctafluorobutane (12.6 g, 27.8 mmol) and ammonium persulfate (APS) (40 mg) dissolved in water (8 g) were added with stirring to initiate polymerization. The polymerization pressure was kept at 1.5 MPa, and a monomer mixture of VdF and HFP (VdF/HFP=78/22, 417 g) was introduced successively. During the polymerization, an aqueous solution prepared by dissolving APS (66 mg) in water (8 g), an aqueous solution prepared by dissolving APS (80 mg) in water (8 g) and an aqueous solution prepared by dissolving APS (96 mg) in water (8 g) were introduced to the polymerization system, two hours after, four hours after and seven hours after starting of the polymerization, respectively. The reaction time was ten hours. The weight of the obtained emulsion was 1,900 g, and the concentration of the elastomer was 20% by weight.

This emulsion was subjected to coagulation with an aqueous solution of aluminum sulfate, followed by washing with hot water to obtain the VdF elastomer having —$CH_2CF_2I$ at its end. According to measurement by $^{19}$F-NMR, the obtained VdF elastomer was one comprising VdF and HFP in a ratio of 78/22 (mole %). The number average molecular weight measured by GPC and converted based on polystyrene was 19,700. Also, in $^1$H-NMR analysis with heavy acetone, a signal derived from the end structure of —$CF_2CH_2I$ was observed at 3.95 to 3.82 ppm. Further, in $^{13}$C-NMR analysis, a signal derived from the end structure of —$CF_2CH_2I$ was observed at −3.2 ppm. As a result of these analyses, about 90% of the ends of the trunk chain of the VdF elastomer were —$CF_2CH_2I$.

Example 1

Preparation of VdF Elastomer Having —$SO_2H$ at its End

The VdF/HFP copolymer of Preparation Example 1 having —$CF_2CH_2I$ at its end (Mn=19,700, 1.00 g, 51 μmol) was put in a 20 ml flask, and dimethyl sulfoxide (10 ml) was added thereto, followed by 6-hour stirring to dissolve the copolymer. After that, to the reaction system were added chlorotrimethylsilane (25 μl, 195 μmol) and then $Na_2S_2O_4$ (226 mg, 1.30 mmol), followed by 1-hour stirring at room temperature under argon gas atmosphere. The reaction solution was poured into water and ethyl acetate was added thereto for separation of the solution (water phase pH: 5). An organic layer was separated and washed with saturated NaCl solution (50 ml). After drying with $MgSO_4$, the solvent was distilled off under reduced pressure.

The number average molecular weight of the obtained VdF elastomer was 19,700. In $^1$H-NMR analysis with heavy acetone solvent, a signal derived from the end structure of —$CF_2CH_2SO_2H$ was observed at 3.47 to 3.60 ppm. Conversion of the ends of the trunk chain calculated from the height of main signal was about 90%. In $^{13}$C-NMR analysis, a signal of the end structure of —$CF_2CH_2I$ was not observed at −3.2 ppm, and a signal derived from the end structure of —$CF_2CH_2SO_2H$ was observed at 59.8 ppm.

It is difficult to objectively indicate by means of figure as to how the end structure of —$CF_2CH_2SO_2H$ is bonded to the end of the trunk chain (one end or both ends). However, when a proportion of the end structures of —$CF_2CH_2SO_2H$ occupying the ends of the trunk chain exceeds 50%, it is obvious that there exists VdF elastomer having the end structure of —$CF_2CH_2SO_2H$ at both ends thereof. There is a case where VdF elastomer having the end structure of —$CF_2CH_2SO_2H$ at both ends thereof exists even when the proportion is 50% or less.

Example 2

Preparation of VdF Elastomer Having —SO$_2$H at Its End

The reaction was carried out in the same manner as in Example 1 by using the VdF/HFP copolymer of Preparation Example 1 (Mn=19,700, 1.00 g, 51 µmol), Na$_2$S$_2$O$_4$ (226 mg, 1.30 mmol) and dimethyl sulfoxide (10 ml) except that chlorotrimethylsilane was not used. In $^1$H-NMR analysis with heavy acetone solvent, a signal derived from the end structure of —CF$_2$CH$_2$SO$_2$H was observed at 3.47 to 3.60 ppm, and a signal derived from the end structure of —CF$_2$CH$_3$ was observed at 1.80 ppm. About 70% of the ends of the trunk chain were —CF$_2$CH$_2$SO$_2$H, and 25% of the ends of the trunk chain were —CF$_2$CH$_3$.

Reference Example 1

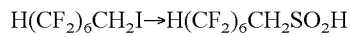

Na$_2$S$_2$O$_4$ (260 mg, 3.0 mmol) was poured into a 20 ml flask and the inside of the flask was replaced with argon. Water (5.0 ml) was added thereto and then, H(CF$_2$)$_6$CH$_2$I (442 mg, 1.0 mmol) was added dropwise using acetonitrile (5.0 ml). After ten-hour stirring at 70° C., purification was conducted by adding 3N—HCl to the reaction product, extracting with ether, extracting into water layer with an aqueous solution of saturated NaHCO$_3$, again making the solution acidic with hydrochloric acid and then extracting into ether layer. After distilling off the solvent, drying was carried out under reduced pressure to obtain H(CF$_2$)$_6$CH$_2$SO$_2$H (359 mg, 0.94 mmol).

$^{19}$F-NMR (CD$_3$COCD$_3$): δ–108.8 (2F), –120.6 (2F), –121.9 (2F), –122.2 (2F), –128.5 (2F), –137.3 (2F) ppm $^1$H-NMR (CD$_3$COCD$_3$): δ3.66 (2H, t), 6.79 (1H, tt), 9.15 (1H, br) ppm In $^{13}$C-NMR analysis, a signal of 60.0 ppm derived from the end structure of —CF$_2$CH$_2$SO$_2$H was observed.

Example 3

Preparation of VdF Elastomer Having —SO$_2$Cl at Its End

Into a 50 ml flask containing the VdF/HFP copolymer (0.94 g, 48 µmol) having —CF$_2$CH$_2$SO$_2$H at its end and synthesized in Example 1 were added acetonitrile (10 ml), acetic acid (100 µl), and then CuCl$_2$ (175 mg, 1.30 mmol), followed by 6-hour reaction under argon gas atmosphere at room temperature.

After the reaction solution was passed through sellaite, the solvent was distilled off under reduced pressure to obtain a VdF/HFP copolymer (0.92 g) having —CF$_2$CH$_2$SO$_2$Cl at its end.

In $^1$H-NMR analysis with heavy acetone solvent, a signal derived from the end structure of —CF$_2$CH$_2$SO$_2$Cl was observed at 5.25 to 5.38 ppm. Also, a signal derived from the end structure of —CF$_2$CH$_2$SO$_3$H was observed at 10.3 ppm. Sixty-five percent of the ends of the trunk chain of the obtained elastomer were —CF$_2$CH$_2$SO$_2$C$_1$, and as a result of hydrolyzation with a trace amount of water being present in the air, in the solvent used in the post-treatment step or in the reaction system, about 30% of the ends of the trunk chain were in the form of —CF$_2$CH$_2$SO$_3$H.

Example 4

Preparation of VdF Elastomer Having —SO$_3$H at Its End

The VdF/HFP copolymer having —CF$_2$CH$_2$I at its end and synthesized in Preparation Example 1 (Mn=19,700, 1.00 g, 51 µmol) was put in a 20 ml flask, and dimethyl sulfoxide (10 ml) was added thereto, followed by 6-hour stirring to dissolve the copolymer. After that, to the reaction system were added chlorotrimethylsilane (25 µl, 195 µmol) and then Na$_2$S$_2$O$_4$ (226 mg, 1.3 mmol), followed by 1-hour stirring at room temperature under argon gas atmosphere. The reaction solution was poured into water and ethyl acetate was added thereto for separation of the solution. An organic layer was separated and washed with a saturated aqueous solution of NaCl (50 ml). After drying with MgSO$_4$, the solvent was distilled off under reduced pressure to obtain a VdF/HFP copolymer having —CF$_2$CH$_2$SO$_2$H at its end.

Into a 50 ml flask containing the synthesized VdF/HFP copolymer (0.90 g) were added acetonitrile (10 ml), acetic acid (100 µl), and then CuCl$_2$ (175 mg, 1.30 mmol), followed by 6-hour reaction under argon gas atmosphere at room temperature to obtain a VdF/HFP copolymer having —CF$_2$CH$_2$SO$_2$Cl at its end.

Then, water (5.0 ml) was added directly to the reaction system, and stirring was continued at room temperature for another eight hours. After that, the reaction solution was condensed under reduced pressure and poured into 1N—HCl (50 ml), and ethyl acetate was added thereto for separation of the solution. An organic layer was separated and washed with a saturated aqueous solution (50 ml) of NaCl. After drying with MgSO$_4$, the solvent was distilled off under reduced pressure, followed by dissolution in acetone and precipitation again with hexane. After collecting the elastomer, it was dried at 60° C. under reduced pressure to obtain a VdF/HFP copolymer (0.81 g) having —CF$_2$CH$_2$SO$_3$H at its end.

In $^1$H-NMR analysis, a signal of the end structure of —CF$_2$CH$_2$SO$_3$H could not be identified since it was overlapped with a peak derived from —CH$_2$— in the trunk chain of the VdF elastomer, but a signal derived from the end structure of —CF$_2$CH$_2$SO$_3$H was observed at 9.67 ppm. In $^{13}$C-NMR analysis, a signal derived from the end structure of —CF$_2$CH$_2$SO$_2$H was not observed at 59.8 ppm, and a signal derived from the end structure of —CF$_2$CH$_2$SO$_3$H was observed at 50.2 ppm.

A part of the reaction solution of VdF/HFP copolymer having —CF$_2$CH$_2$SO$_2$Cl at its end was collected, and ethanol (1.0 ml) was added thereto. The end structure was determined by $^1$H-NMR analysis in the form of the sulfonic acid ethyl ester. Signals derived from ethyl ester were observed at 4.42 to 4.48 ppm and 1.36 to 1.41 ppm. A ratio of conversion of the ends of the trunk chain was 92%. The number average molecular weight of the obtained VdF elastomer was 19,800.

Example 5

Preparation of VdF Elastomer Having —SO$_3$H at Its End

A VdF/HFP copolymer having —CF$_2$CH$_2$I at its end (Mn=103,000, 1.00 g, 9.7 µmol) was put in a 20 ml flask, and dimethyl sulfoxide (10 ml) was added thereto, followed by 6-hour stirring to dissolve the copolymer. After that, to the reaction system were added chlorotrimethylsilane (25 µl, 195 µmol) and then Na$_2$S$_2$O$_4$ (226 mg, 1.3 mmol), followed by one-hour stirring at room temperature under argon gas atmosphere. The reaction solution was poured into water and ethyl acetate was added thereto for separation of the solution. An organic layer was separated and washed with a saturated aqueous solution of NaCl (50 ml). After drying with MgSO₄, the solvent was distilled off under reduced pressure to obtain a VdF/HFP copolymer having —CF₂CH₂SO₂H at about 80% of the ends of the trunk chain.

Into a 50 ml flask containing the synthesized VdF/HFP copolymer (0.72 g, 7.0 μmol) were added acetonitrile (10 ml), acetic acid (100 μl), and then CuCl₂ (175 mg, 1.30 mmol), followed by 6-hour reaction at room temperature under argon gas atmosphere to obtain a VdF/HFP copolymer having —CF₂CH₂SO₂Cl at its end.

Then, water (5.0 ml) was added directly to the reaction system, and stirring was continued at room temperature for another eight hours. After that, the reaction solution was condensed under reduced pressure and poured into 1N—HCl (50 ml), and ethyl acetate was added thereto for separation of the solution. An organic layer was separated and washed with a saturated aqueous solution (50 ml) of NaCl. After drying with MgSO₄, the solvent was distilled off under reduced pressure, followed by dissolution in acetone and precipitation again with hexane. After collecting the elastomer, it was dried at 60° C. under reduced pressure to obtain a VdF/HFP copolymer (0.70 g) having —CF₂CH₂SO₃H at about 60% of the ends of the trunk chain.

In $^1$H-NMR analysis, a signal derived from the end structure of —CF₂CH₂SO₃H could not be identified since it was overlapped with a peak derived from —CH₂— in the trunk chain of the VdF elastomer, but a signal derived from the end structure of —CF₂CH₂SO₃H was observed at 9.88 ppm. In $^{13}$C-NMR analysis, a signal derived from the end structure of —CF₂CH₂SO₃H was observed at 50.3 ppm.

Example 6

Preparation of VdF Elastomer Having —SO₃H at its End

A VdF/HFP copolymer having —CH₂CF₂I at its end (containing 81% by mole of CH₂CF₂I at its end, Mn=1,500, 1.00 g, 0.68 mmol) was put in a 20 ml flask, and dimethyl sulfoxide (10 ml) was added thereto, followed by one-hour stirring to dissolve the copolymer. After that, to the reaction system were added chlorotrimethylsilane (300 μl, 2.4 mmol) and then Na₂S₂O₄ (1.74 g, 10 mmol), followed by one-hour stirring at room temperature under argon gas atmosphere. The reaction solution was poured into water and ethyl acetate was added thereto for separation of the solution. An organic layer was separated and washed with a saturated aqueous solution (50 ml) of NaCl. After drying with MgSO₄, the solvent was distilled off under reduced pressure to obtain a VdF oligomer having —CH₂CF₂SO₂H at about 90% of the ends of the trunk chain.

Into a 50 ml flask containing the synthesized VdF oligomer (0.80 g, 0.67 mmol) were added acetonitrile (10 ml), acetic acid (100 μl), and then CuCl₂ (175 mg, 1.30 mmol), followed by 6-hour reaction at room temperature under argon gas atmosphere to obtain a VdF/HFP copolymer having —CH₂CF₂SO₂Cl at its end.

Then, water (5.0 ml) was added directly to the reaction system, and stirring was continued at room temperature for another eight hours. After that, the reaction solution was condensed under reduced pressure and poured into 1N—HCl (50 ml), and ethyl acetate was added thereto for separation of the solution. An organic layer was separated and washed with a saturated aqueous solution (50 ml) of NaCl. After drying with MgSO₄, the solvent was distilled off under reduced pressure, followed by dissolution in acetone and precipitation again with hexane. After collecting the elastomer, it was dried at 60° C. under reduced pressure to obtain a VdF/HFP copolymer (0.95 g) having —CH₂CF₂SO₃H at about 90% of the ends of the trunk chain.

In $^{19}$F-NMR analysis, a signal derived from the end structure of —CH₂CF₂SO₃H was observed at −47.5 ppm, and was confirmed to be different from −37.8 ppm of the end structure of —CF₂I. The number average molecular weight of the VdF elastomer was 1,400.

Reference Example 2

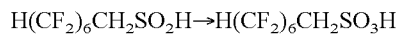

H(CF₂)₆CH₂SO₂H (1.00 g, 2.63 mmol) was put in a 100 ml flask, and was dissolved in acetic acid (20 ml) in the air. After the reaction system was dipped in ice bath and water (1.0 ml) was added thereto, bromine (1.1 g, 6.84 mmol) was added and stirring was continued at room temperature for 12 hours. After completion of the reaction, the inside of the system was brought to reduced pressure, and after removing the solvent and bromine, the reaction product was dried in vacuo at 60° C. for 12 hours to obtain H(CF₂)₆CH₂SO₃H (1.04 g, 2.63 mmol).

$^{19}$F-NMR (CD₃COCD₃): δ−113.3 (2F), −120.7 (2F), −122.3 (4F), −128.6 (2F), −137.4 (2F) ppm $^1$H-NMR (CD₃COCD₃): δ3.58 (2H, t), 6.83 (1H, t) ppm In $^{13}$C-NMR analysis, a signal derived from the end structure of —CF₂CH₂SO₃H was observed at 50.2 ppm.

Example 7

Preparation of VdF Elastomer Having —SO₃Na at Its End

Synthesis of a VdF/HFP copolymer having —CF₂CH₂SO₂Cl at its end was carried out in the same manner as in Example 4. Namely, the VdF/HFP copolymer (Mn=19,700, 1.00 g, 51 μmol) having —CF₂CH₂I at its end prepared in Preparation Example 1, chlorotrimethylsilane (25 μl, 195 μmol) and Na₂S₂O₄ (226 mg, 1.3 mmol) were reacted in dimethyl sulfoxide (10 ml) and then, allowed to react with CuCl₂ (175 mg, 1.30 mmol) in acetonitrile (10 ml)/acetic acid (100 μl) to synthesize a VdF/HFP copolymer having —CF₂CH₂SO₂Cl at its end.

The reaction solution was poured into 0.5 N aqueous solution (50 ml) of Na₂CO₃, followed by one-hour stirring at room temperature. The precipitated VdF elastomer was dissolved in acetone and precipitated again with water. After collecting the elastomer, it was again dissolved in acetone and precipitated again with hexane. After drying at 60° C. under reduced pressure, a VdF/HFP copolymer (0.94 g) having —CF₂CH₂SO₃Na at about 90% of the ends of the trunk chain was obtained.

In $^1$H-NMR analysis, a signal derived from the end structure of —CF₂CH₂SO₃H could not be identified since it was overlapped with a peak derived from —CH₂— in the trunk chain of the VdF elastomer, and also a signal derived from the end structure of —CF₂CH₂SO₃H was not observed. In $^{13}$C-NMR analysis, a signal derived from the end structure of —CF₂CH₂SO₃Na was observed at 50.7 ppm. The number average molecular weight of the obtained VdF elastomer was 19,900.

Example 8

Preparation of VdF Elastomer Having —$SO_2Cl$ at its End by Using Sulfuryl Chloride

After pouring acetonitrile (10 ml) in a 50 ml flask containing the VdF/HFP copolymer (0.90 g, 46 µmol) having —$CF_2CH_2SO_3H$ at its end prepared in Preparation Example 1, sulfuryl chloride (100 µl, 1.23 mmol) was added thereto, followed by six-hour reaction at room temperature under argon gas atmosphere.

The solvent of the reaction solution was distilled off under reduced pressure to obtain a VdF/HFP copolymer (0.90 g) having —$CF_2CH_2SO_2Cl$ at its end.

In $^1$H-NMR analysis with heavy acetone solvent, a signal derived from the end structure of —$CF_2CH_2SO_2Cl$ was observed at 5.25 to 5.38 ppm. Also, a signal derived from the end structure of —$CF_2CH_2SO_3H$ was observed at 10.3 ppm. Seventy percent of the ends of the trunk chain were —$CF_2CH_2SO_2Cl$, and as a result of hydrolyzation with a trace amount of water being present in the air, in the solvent used in the post-treatment step or in the reaction system, about 10% of the ends of the trunk chain were in the form of —$CF_2CH_2SO_3H$.

Example 9

Preparation of VdF Elastomer Having —$SO_3H$ at Its End by Using Sulfuryl Chloride

The VdF/HFP copolymer (Mn=19,700, 1.00 g, 51 µmol) having —$CF_2CH_2I$ at its end prepared in Preparation Example 1 was put in a 20 ml flask, and dimethyl sulfoxide (10 ml) was added thereto, followed by 6-hour stirring to dissolve the copolymer. After that, to the reaction system were added chlorotrimethylsilane (25 µl, 195 µmol) and then $Na_2SO_4$ (226 mg, 1.3 mmol), followed by 1-hour stirring at room temperature under argon gas atmosphere. The reaction solution was poured into water and ethyl acetate was added thereto for separation of the solution. An organic layer was separated and washed with a saturated aqueous solution (50 ml) of NaCl. After drying with $MgSO_4$, the solvent was distilled off under reduced pressure to obtain a VdF/HFP copolymer having —$CF_2CH_2SO_2H$ at its end.

Into a 50 ml flask containing the VdF/HFP copolymer (0.90 g) synthesized above were added acetonitrile (10 ml) and then sulfuryl chloride (100 µl, 1.23 mmol), followed by 6-hour reaction at room temperature under argon gas atmosphere to obtain a VdF/HFP copolymer having —$CF_2CH_2SO_2Cl$ at its end.

Then, water (5.0 ml) was added directly to the reaction system, and stirring was continued at room temperature for another eight hours. After that, the reaction solution was condensed under reduced pressure and poured into 1N—HCl (50 ml), and ethyl acetate was added thereto for separation of the solution. An organic layer was separated and washed with a saturated aqueous solution (50 ml) of NaCl. After drying with $MgSO_4$, the solvent was distilled off under reduced pressure, followed by dissolution in acetone and precipitation again with hexane. After collecting the elastomer, it was dried at 60° C. under reduced pressure to obtain a VdF/HFP copolymer (0.73 g) having —$CF_2CH_2SO_3H$ at its end.

In $^1$H-NMR analysis, a signal derived from the end structure of —$CF_2CH_2SO_3H$ could not be identified since it was overlapped with a peak derived from —$CH_2$— in the trunk chain of the VdF elastomer, but a signal derived from the end structure of —$CF_2CH_2SO_3H$ was observed at 9.65 ppm. In $^{13}$C-NMR analysis, a signal of the end structure of —$CF_2CH_2SO_2H$ was not observed at 59.8 ppm, and a signal derived from the end structure of —$CF_2CH_2SO_3H$ was observed at 50.1 ppm.

A part of the reaction solution of VdF/HFP copolymer having —$CF_2CH_2SO_2Cl$ at its end was collected, and ethanol (1.0 ml) was added thereto. The end structure was determined by $^1$H-NMR analysis in the form of the sulfonic acid ethyl ester. Signals derived from ethyl ester were observed at 4.42 to 4.48 ppm and 1.36 to 1.41 ppm. A ratio of conversion of the ends of the trunk chain was 61%. The number average molecular weight of the obtained VdF elastomer was 19,800.

Example 10

Preparation of VdF Elastomer Having —$SO_3H$ at Its End by Using Bromine

The VdF/HFP copolymer (Mn=19,700, 1.00 g, 51 µmol) having —$CF_2CH_2I$ at its end prepared in Preparation Example 1 was put in a 20 ml flask, and dimethyl sulfoxide (10 ml) was added thereto, followed by 6-hour stirring to dissolve the copolymer. After that, to the reaction system were added chlorotrimethylsilane (25 µl, 195 µmol) and then $Na_2S_2O_4$ (226 mg, 1.3 mmol), followed by 1-hour stirring at room temperature under argon gas atmosphere. The reaction solution was poured into water and ethyl acetate was added thereto for separation of the solution. An organic layer was separated and washed with a saturated aqueous solution (50 ml) of NaCl. After drying with $MgSO_4$, the solvent was distilled off under reduced pressure to obtain a VdF/HFP copolymer having —$CF_2CH_2SO_2H$ at its end.

Into a 50 ml flask containing the VdF/HFP copolymer (0.90 g) synthesized above were added acetonitrile (10 ml) and then bromine (400 mg, 2.50 mmol), followed by 6-hour reaction at room temperature under argon gas atmosphere to obtain a VdF/HFP copolymer having —$CF_2CH_2SO_2Br$ at its end.

Then, water (5.0 ml) was added directly to the reaction system, and stirring was continued at room temperature for another eight hours. After that, the reaction solution was condensed under reduced pressure and poured into 1N—HCl (50 ml), and ethyl acetate was added thereto for separation of the solution. An organic layer was separated and washed with a saturated aqueous solution (50 ml) of NaCl. After drying with $MgSO_4$, the solvent was distilled off under reduced pressure, followed by dissolution in acetone and precipitation again with hexane. After collecting the elastomer, it was dried at 60° C. under reduced pressure to obtain a VdF/HFP copolymer (0.89 g) having —$CF_2CH_2SO_3H$ at about 80% of the ends of the trunk chain.

In $^1$H-NMR analysis, a signal derived from the end structure of —$CF_2CH_2SO_3H$ could not be identified since it was overlapped with a peak derived from —$CH_2$— in the trunk chain of the VdF elastomer, but a signal derived from the end structure of —$CF_2CH_2SO_3H$ was observed at 9.73 ppm. The number average molecular weight of the obtained VdF elastomer was 19,800.

Example 11

Preparation of VdF Elastomer Having —$SO_3H$ at Its End

The VdF/HFP copolymer (Mn=19,700, 1.00 g, 51 µmol) having —$CF_2CH_2I$ at its end prepared in Preparation Example 1 was put in a 20 ml flask, and dimethyl sulfoxide (10 ml) was added thereto, followed by 6-hour stirring to dissolve the copolymer. After that, to the reaction system were added chlorotrimethylsilane (25 µl, 195 µmol) and then Na$_2$S$_2$O$_4$ (226 mg, 1.3 mmol), followed by 1-hour stirring at room temperature under argon gas atmosphere. The reaction solution was poured into water and ethyl acetate was added thereto for separation of the solution. An organic layer was separated and washed with a saturated aqueous solution (50 ml) of NaCl. After drying with MgSO$_4$, the solvent was distilled off under reduced pressure to obtain a VdF/HFP copolymer having —CF$_2$CH$_2$SO$_2$H at its end.

Into a 50 ml flask containing the synthesized VdF/HFP copolymer (0.90 g) having —CF$_2$CH$_2$SO$_2$H at its end were added acetonitrile (10 ml), water (1 ml), and then bromine (400 mg, 2.50 mmol), followed by 6-hour reaction at room temperature under argon gas atmosphere to convert to a VdF/HFP copolymer having —CF$_2$CH$_2$SO$_3$H at its end.

Then, the reaction solution was condensed under reduced pressure and poured into 1N—HCl (50 ml), and ethyl acetate was added thereto for separation of the solution. An organic layer was separated and washed with a saturated aqueous solution (50 ml) of NaCl. After drying with MgSO$_4$, the solvent was distilled off under reduced pressure, followed by dissolution in acetone and precipitation again with hexane. After collecting the elastomer, it was dried at 60° C. under reduced pressure to obtain a VdF/HFP copolymer (0.81 g) having —CF$_2$CH$_2$SO$_3$H at about 80% of the ends of the trunk chain.

In $^1$H-NMR analysis, a signal derived from the end structure of —CF$_2$CH$_2$SO$_3$H could not be identified since it was overlapped with a peak derived from —CH$_2$— in the trunk chain of the VdF elastomer, but a signal derived from the end structure of —CF$_2$CH$_2$S$_3$H was observed at 9.67 ppm. In $^{13}$C-NMR analysis, a signal derived from the end structure of —CF$_2$CH$_2$SO$_2$H was not observed at 59.8 ppm, and a signal derived from the end structure of —CF$_2$CH$_2$SO$_3$H was observed at 50.2 ppm.

INDUSTRIAL APPLICABILITY

According to the preparation process of the present invention, one end or both ends of the trunk chain can be converted to sulfunic acid end at high yield. Also, the obtained sulfunic acid end can be converted to halogenated sulfonyl or sulfonic acid at high yield by high molecular reaction.

In addition, with respect to the vinylidene fluoride elastomer having specific group prepared by the preparation process of the present invention, enhancement of adhesion and dispersibility of filler can be expected.

Further, the vinylidene fluoride elastomer having specific group prepared by the preparation process of the present invention can be converted to a liquid rubber, a thermoplastic elastomer and a block copolymer and is useful as an intermediate of a polymer.

The invention claimed is:

1. A process for preparing an end-modified vinylidene fluoride elastomer having, at one end or both ends of its trunk chain, end groups represented by —CF$_2$CH$_2$SO$_2$H,
by allowing a vinylidene fluoride elastomer having a number average molecular weight of not less than 1,000 and having, at one end or both ends of its trunk chain, end groups represented by —CF$_2$CH$_2$I,
to react with a sulfur compound represented by the formula (2):

$$(M^1)_n H_{2-n} S_2 O_4 \tag{2}$$

wherein M$^1$ is a monovalent or divalent metal ion or ammonium ion, n is an integer of 0 to 2.

2. The process for preparing an end-modified vinylidene fluoride elastomer of claim 1, wherein a number average molecular weight of the elastomer is 1,000 to 1,000,000.

3. The process for preparing an end-modified vinylidene fluoride elastomer of claim 1, wherein the structure of the vinylidene fluoride elastomer excluding both end groups thereof is represented by the formula (6):

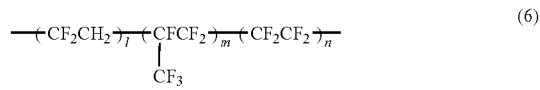

(6)

wherein l is an integer of 7 to 15,000, m is an integer of 1 to 4,900, n is an integer of 0 to 6,500.

4. The process for preparing an end-modified vinylidene fluoride elastomer of claim 1, wherein the vinylidene fluoride elastomer having, at one end or both ends of its trunk chain, end groups represented by CF$_2$CH$_2$I is a vinylidene fluoride elastomer obtained by iodine transfer polymerization.

5. The process for preparing an end-modified vinylidene fluoride elastomer of claim 2, wherein the structure of the vinylidene fluoride elastomer excluding both end groups thereof is represented by the formula (6):

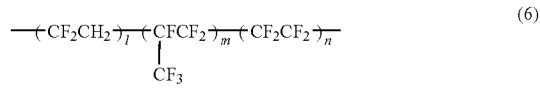

(6)

wherein l is an integer of 7 to 15,000, m is an integer of 1 to 4,900, n is an integer of 0 to 6,500.

* * * * *